3,845,181
PRODUCTION OF POROUS CERAMIC MATERIALS THROUGH THE USE OF FOAM ATTACKING AGENTS

Frank Ernest George Ravault, Birmingham, England, assignor to Foseco International Limited, Birmingham, England
No Drawing. Filed Dec. 29, 1972, Ser. No. 319,764
Claims priority, application Great Britain, Jan. 14, 1972, 1,927/72
Int. Cl. B28b 21/94; C04b 21/06, 33/32
U.S. Cl. 264—44          4 Claims

ABSTRACT OF THE DISCLOSURE

Porous ceramic materials are made by impregnating an organic foam with a slurry of finely divided ceramic, drying and firing. In order to improve final strength the foam is attacked by certain additives prior to or during impregnation.

---

This invention relates to the production of porous ceramic materials.

Methods of making porous ceramic materials are described in British patent specifications 923,862, 916,784, 1,004,352, 1,019,807, 1,054,421. In these methods the general procedure is to take a body of porous organic foam material, e.g. polyurethane foam, impregnate the foam with a slurry of finely divided ceramic material, usually in water, and finally dry and fire the so-obtained structure. The organic foam disappears on firing to leave a ceramic structure.

The strength of porous ceramic materials so manufactured is often not very great. This is believed to stem from the fact that during firing, the original organic foam structure burns out to leave thin, very fragile, webs of ceramic material. In the case of a reticular organic foam, ceramic tubes will be formed; in the case of a foam with cell walls, fragile ceramic part spheres which are very weakly bonded will occur. In either case, the structure is not adapted to withstand loading. In some case, the fired material may not even be handleable. The problem may be alleviated somewhat by carbonizing the organic foam structure in an inert atmosphere during the firing process by incorporating in the slurry a material such as starch which will provide a temporary carbon skeleton, or by prolonged or higher temperature firing. However, some of these procedures may lead to very severe shrinkage and distortion on firing, which is undesirable.

In addition when carbon forming materials are used in the slurry a controlled atmosphere firing, which is inconvenient and expensive to provide, is often necessary. Strength may also be increased by the use of materials known per se as binders for ceramic products, for example, alkali metal phosphates, borates or silicates or strong mineral acids. However, the use of such binders may cause contamination of the porous ceramic by introducing extraneous ions. These ions product compositional changes and affect the properties of the porous ceramic. For example, alkali metal ions reduce refractoriness, thus making the porous ceramic unsuitable for applications where refractoriness is important. Naturally, if refractoriness is not required in the finished product, the presence of alkali metal is not disadvantageous. In some instances the actual presence of a particular ion can render the porous ceramic unsuitable for a particular application. For example, a porous ceramic containing phosphate would not be suitable for use as a catalyst support.

The object of the present invention is to produce a strong porous ceramic without any of the disadvantages described above.

According to the present invention, the foam is attacked during the manufacturing process by an agent other than a material known per se as a ceramic binder. Conveniently the slurry of finely divided particulate material contains an agent capable of attacking the foam, though if desired, the foam may be treated with the attacking agent prior to impregnation with slurry provided the attack is not so rapid at ambient temperatures that the foam prematurely disintegrates. After impregnation with ceramic slurry and during drying, when the temperature is increasing and the concentration of the attacking agent rises consequent on the evaporation of the slurry carrier, the foam is attacked rapidly, and the dried (but unfired) structure tends to become a coherent foam-structured mix of finely divided particulate ceramic material and organic foam breakdown products rather than a foam coated with a layer of particulate ceramic. Thus, on firing, a solid more coherent overall structure forms, having far higher strength, due to the effect of the foam attacking agent.

Naturally, care must be taken in selecting the optimum attacking agent for the circumstances. The attacking agent must partly dissolve, hydrolyse or depolymerise the organic foam in situ in the time available. Preferably it should also have the following characteristics:

(1) It should be soluble in or miscible with the liquid medium of the slurry.

(2) If it decomposes its decomposition temperature should be above the boiling-point of the medium.

(3) Its boiling point should be above that of the slurry medium, and it should not form an azeotrope with the medium.

(4) It should not leave a residue after firing which will adversely affect the properties of the final ceramic body.

Various combinations of foam and attacking agent may be chosen, and we have found that the most effective system is one in which a polyester polyurethane foam is attacked by one or more substances selected from the class consisting of glycols, long chain fatty acids and alkoxy derivatives of amines, such as:

monoethylene glycol
diethylene glycol
stearic acid
oleic acid
monoethanolamine, diethanolamine or triethanolamine.

The aforegoing examples are given by way of illustration only, and are not intended to exclude other substances which react in a similar manner.

The most preferred attacking agents are organic bases particularly monoethanolamine.

Polyether polyurethanes may be used but they tend to be too chemically stable to readily decompose but nevertheless swell in contact with certain solvents, acids and bases, often to such an extent that their structure is lost.

The following examples will serve to illustrate the invention.

EXAMPLE I

Pieces of reticular polyester polyurethane foam, 43 mm. square and 15 mm. thick having 5 pores per linear cm. were dipped into a 0.1% by weight solution in 50:50 methanol/water of a cationic polyacrylamide of molecular weight approximately 1,000,000 as taught in our copending application Ser. No. 317,088, filed Dec. 20, 1972, now pending. Surplus solution was centrifuged off, and the pieces were dried in a current of hot air.

A ceramic slip was prepared having the following composition:

| | Parts by weight |
|---|---|
| Dextrin | 13 |
| Kaolin | 17 |
| Nepheline syenite—all less than 0.075 mm. | 23 |
| Micronized alumina—particle size range 0.004–0.010 mm. | 47 |
| Water | 150 |

To each litre of slip were added 5 ml. each of Silcolapse 5000 and Permanal Ana (anti-foaming agents). This is in accordance with the teaching in our application Ser. No. 319,849, filed Dec. 29, 1972, now pending. The slip was divided into two parts, and to one part was added 100 ml. monoethanolamine per litre of slip.

The pieces of treated foam were then dipped into one or other of the slips, and withdrawn.

The pieces of treated foam were then centrifuged to remove surplus slip, dried in a microwave oven, given a second coating of the slip, dried again, and loaded into saggars and heated to 300° C. at a maximum rate of 100° C./hr., held at that temperature for 4 hours then heated to 1290° C. at a maximum rate of 100° C./hr. held at 1290° C. for 16 hours, then cooled to room temperature at a maximum rate of 100° C./hr.

Pieces of reticular high alumina porcelain measuring 37.5 mm. square by 14 mm. thick resulted. These were then compressed between two oposite major faces, and the force needed to shatter the specimen measured.

The specimens made with slip with no monoethanolamine shattered at an average load of 6.6 kg. force whereas those made with slip containing monoethanolamine shattered at an average load of 14.3 kg. force.

A visual inspection of the shattered fragments was made with a microscope: in the material untreated with monoethanolamine the tubular form of the strands could clearly be seen at their broken ends. In the monoethanolamine treated material the structure was formed of solid rods.

EXAMPLE II

Pieces of polyester polyurethane foam of the same grade as used in Example I were soaked for 2 hours in monoethanolamine, rinsed in running water, and dried. They were then treated in the monoethanolamine-free slip described in Example I, and dried, recoated, redried and heated as described in Example I.

Recticular high alumina porcelain samples measuring 37.5 mm. square by 14 mm. thick resulted, and in compression testing between major faces an average load of 20.2 kg. force was needed to shatter the specimens.

I claim as my invention:

1. In the method of making a porous ceramic material which includes the steps of impregnating a body of polyurethane foam material with a slurry of finely divided ceramic material, and drying and firing the so-impregnated body, the improvement which comprises treating the polyurethane foam material no later than during impregnation of the foam with a foam attacking agent selected from the class consisting of glycols, long-chain fatty acids and alkoxy derivatives of amines.

2. The method of claim 1 wherein the attacking agent is monoethanolamine.

3. The method of claim 1 wherein the attacking agent is dissolved in the slurry.

4. The method of claim 1 wherein the attacking agent is dispersed in the slurry.

References Cited

UNITED STATES PATENTS

| 3,090,094 | 5/1963 | Schwartzwalder et al. | 264—44 |
| 3,097,930 | 7/1963 | Holland | 264—44 |

FOREIGN PATENTS

| 916,784 | 1/1963 | Great Britain | 264—44 |

DONALD E. CZAJA, Primary Examiner

G. R. MARSHALL, Assistant Examiner

U.S. Cl. X.R.

106—40 R, 71; 117—46 R, 113, 161 P; 260—2.5 R, 2.5 BD; 264—26, 59, 215, 332